United States Patent

Takeuchi et al.

[11] Patent Number: 5,155,728
[45] Date of Patent: * Oct. 13, 1992

[54] TIME DIVISION SPEECH PATH APPARATUS

[75] Inventors: Wataru Takeuchi; Takashi Matsumoto, both of Tokyo, Japan

[73] Assignee: NEC Corporation, Tokyo, Japan

[*] Notice: The portion of the term of this patent subsequent to Aug. 13, 2008 has been disclaimed.

[21] Appl. No.: 552,759

[22] Filed: Jul. 16, 1990

[30] Foreign Application Priority Data

Jul. 18, 1989 [JP] Japan .................................. 1-186754

[51] Int. Cl.⁵ .............................................. H04J 3/06
[52] U.S. Cl. .............................. 370/100.1; 370/58.1; 370/112
[58] Field of Search ...................... 370/100.1, 60, 58.1, 370/112, 94.1, 66

[56] References Cited

U.S. PATENT DOCUMENTS

| 4,543,652 | 9/1985 | Amada et al. | 370/66 |
| 4,656,625 | 4/1987 | Nojiri et al. | 370/112 |
| 4,788,680 | 11/1988 | Kikuchi et al. | 370/112 |
| 4,823,342 | 4/1989 | Morita et al. | 370/58.1 |
| 4,941,141 | 7/1990 | Hayano | 370/100.1 |
| 4,947,388 | 8/1990 | Kuwahara et al. | 370/60 |

OTHER PUBLICATIONS

J. Bellamy, "Digital Telephony", John Wiley & Sons, Inc., 1982, pp. 242-249.

Primary Examiner—Douglas W. Olms
Assistant Examiner—Dang T. Ton
Attorney, Agent, or Firm—Helfgott & Karas

[57] ABSTRACT

A time division speech path apparatus includes a frame synchronization detector, a pointer detector, a pointer inserting circuit, an address converter, a selector, and a demultiplexer. Pointers are set on highways so that a relationship between the time slots on the highways and addresses of the speech path memory at which the time slots are written is determined on the basis of the frame phases and pointer values of the respective highways. Data read out from the speech path control memory are converted into addresses in accordance with this relationship and are supplied as read addresses to the speech path memory.

1 Claim, 6 Drawing Sheets

SPEECH PATH MEMORY (SPM)

| ADDRESS | 2 | 5 | 4 | 7 | 8 | 1 | 10 | 3 | 0 | 9 | 6 | 11 |
|---|---|---|---|---|---|---|---|---|---|---|---|---|
| STORAGE DATA | FS 0 | FS 1 | PT 0 | PT 1 | A | E | B | F | C | G | D | H |
| INPUT HIGHWAY NUMBER | 0 | 1 | 0 | 1 | 0 | 1 | 0 | 1 | 0 | 1 | 0 | 1 |
| DATA CODE | FS | FS | PT | PT | CH 0 | CH 0 | CH 1 | CH 1 | CH 2 | CH 2 | CH 3 | CH 3 |

FIG.5

SPEECH PATH CONTROL MEMORY (SCM)

| OUTPUT HIGHWAY | | SCM | | INPUT HIGHWAY | |
|---|---|---|---|---|---|
| NUMBER | DATA CODE | ADDRESS | DATA | NUMBER | DATA CODE |
| 0 | FS 0 | 0 | 0 | 0 | FS 0 |
| 1 | FS 1 | 1 | 1 | 1 | FS 1 |
| 0 | PT 0 | 2 | 2 | 0 | PT 0 |
| 1 | PT 1 | 3 | 3 | 1 | PT 1 |
| 0 | CH 0 | 4 | 4 | 0 | CH 0 |
| 1 | CH 0 | 5 | 11 | 1 | CH 3 |
| 0 | CH 1 | 6 | 9 | 1 | CH 2 |
| 1 | CH 1 | 7 | 7 | 1 | CH 1 |
| 0 | CH 2 | 8 | 10 | 0 | CH 3 |
| 1 | CH 2 | 9 | 6 | 0 | CH 1 |
| 0 | CH 3 | 10 | 8 | 0 | CH 2 |
| 1 | CH 3 | 11 | 5 | 1 | CH 0 |

FIG.6

TIME DIVISION SPEECH PATH APPARATUS

CROSS REFERENCE TO RELATED APPLICATION

This application is co-pending with the commonly owned application Ser. No. 562,598, filed Aug. 3, 1990, which was allowed.

BACKGROUND OF THE INVENTION

The present invention relates to a time division speech path apparatus of a digital switching system.

In a conventional time division speech path apparatus of a digital switching system, when a plurality of highways having different phases are used as input highways, time division switching is performed in the following manner. A buffer memory is arranged for each input highway. Frame synchronization of the overall highways is performed by performing frame synchronization in such a manner that write operations are performed in accordance with the phases of the input highways, and read operations are performed in accordance with the specific system phase of the speech path. Data from the highways having synchronized frame phases are multiplexed and written in a speech path memory, and data is read out from the speech path memory in accordance with contents read out from a speech path control memory.

In the above-described conventional time division speech path apparatus, since the buffer memories are arranged for the respective input highways, an increase in delay time cannot be avoided. In addition, with an increase in speed of a highway, the required capacity of a buffer memory is increased, resulting in an increase in hardware amount of the system.

SUMMARY OF THE INVENTION

It is an object of the present invention to provide a time division speech path apparatus which can prevent an increase in delay time and hardware amount due to buffer memories.

In order to achieve the above object, according to the present invention, there is provided a time division speech path apparatus, having time division highways having different frame phases as input highways, for performing time division switching between time slots of the input highways and output highways by using a multiplexer for the time division highways, a speech path memory, and a speech path control memory, the time division speech path apparatus comprising a frame synchronization detector for detecting frame positions (highway phases) on data formats of the respective input highways and synchronizing byte phase divisions between the input highways, each of the data formats being constituted by a pointer consisting of at least one byte representing a time slot position at which a first channel of user data on a corresponding one of the time division highways is stored, and a plurality of time slots for carrying a plurality of user data, a pointer detector for holding a difference between a highway phase from the frame synchronization detector and a specific system frame phase of the speech path apparatus and a pointer value read out from contents of the pointer of each of the input highways, a pointer inserting circuit for writing pointer values in pointers on the output and input highways, an address converter for converting data read out from the speech path control memory and outputting the converted data as an address of the speech path memory, a selector for selecting and supplying sequential addresses, which are sequentially generated by a counter in accordance with the system frame phase, to the speech path memory during a write mode of the speech path memory so as to sequentially write data obtained by multiplexing data from the input highways in the speech path memory, and selecting and supplying an address to the speech path memory during a read mode of the speech path memory, the address being obtained by converting contents read out from the speech path control memory according to a predetermined rule on the basis of contents of a pointer value held in the pointer detector so as to actually read data from the speech path memory, and a demultiplexer for sequentially reading out contents from the speech path memory, demultiplexing the read contents, and outputting the demultiplexed data to the output highways.

BRIEF DESCRIPTION OF THE DRAWINGS

FIG. 5 is an address/data contrast table of a speech path memory in which the data shown in FIG. 4 are written;

FIG. 6 is a contrast table showing a relationship in the highway format shown in FIG. 3 between input and output highways mainly in terms of address/data of a speech path control memory;

DETAILED DESCRIPTION OF THE PREFERRED EMBODIMENT

The present invention will be described below with reference to the accompanying drawings.

Figure 1:
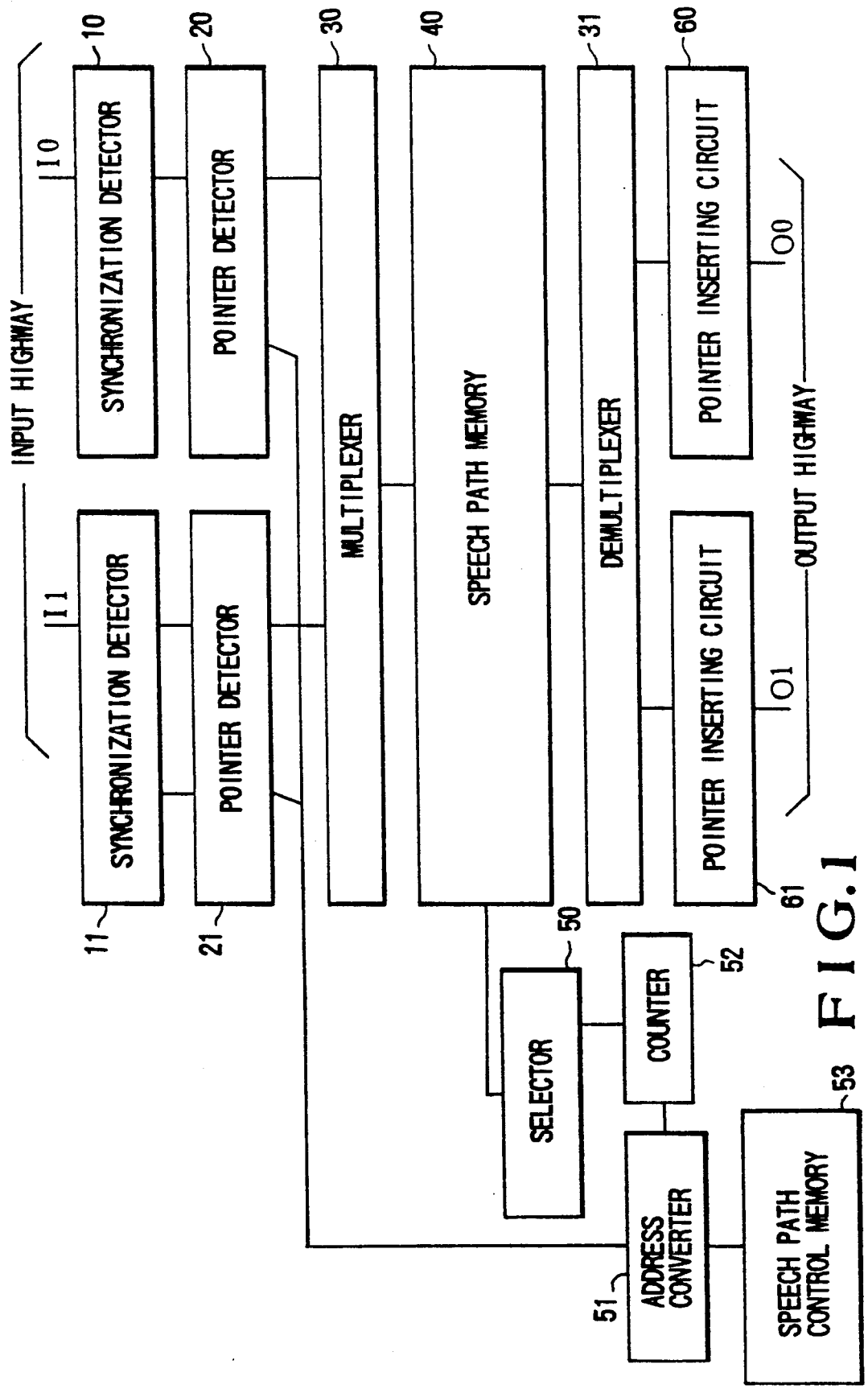
FIG. 1 is a block diagram showing a time division speech path apparatus according to an embodiment of the present invention.

FIG. 1 shows an embodiment of the present invention. Transmission data from input highways $I_0$ and $I_1$ are multiplexed by a multiplexer 30 through frame synchronization detectors 10 and 11 and pointer detectors 20 and 21. The multiplexed data are sequentially written in a speech path memory (SPM) 40 in accordance with the value of a counter 52 which is operated at the specific system phase of a speech path system. The frame synchronization detectors 10 and 11 supply detected frame phases of the input highways $I_0$ and $I_1$ to the pointer detectors 20 and 21, respectively. The pointer detectors 20 and 21 respectively detect differences between the frame phases and the system phase and pointer values and acknowledge them to an address converter 51. A speech path control memory (SCM) 53 is a memory in which data corresponding to speech paths are written. Data is read out from the speech path control memory 53 in accordance with a read frame phase which is set to be specifically assigned to the system independently of the system phase. The address converter 51 converts the read data into an address by which data is actually read out from the speech path memory 40. That is, the address is provided as a read address for the speech path memory 40. A selector 50 is a circuit for selecting either a write address or a read address, and is equivalent to a circuit having the same function in a conventional time division speech path. A demultiplexer 31 separates data read out from the speech path memory 40 in accordance with the read address supplied from the speech path control memory 53 to the speech path memory 40 through the address converter 51 and the selector 50. The pointer values of the separated data are set by pointer inserting circuits 60 and 61, and the data are then output to output highways $O_0$ and $O_1$.

Figure 2:
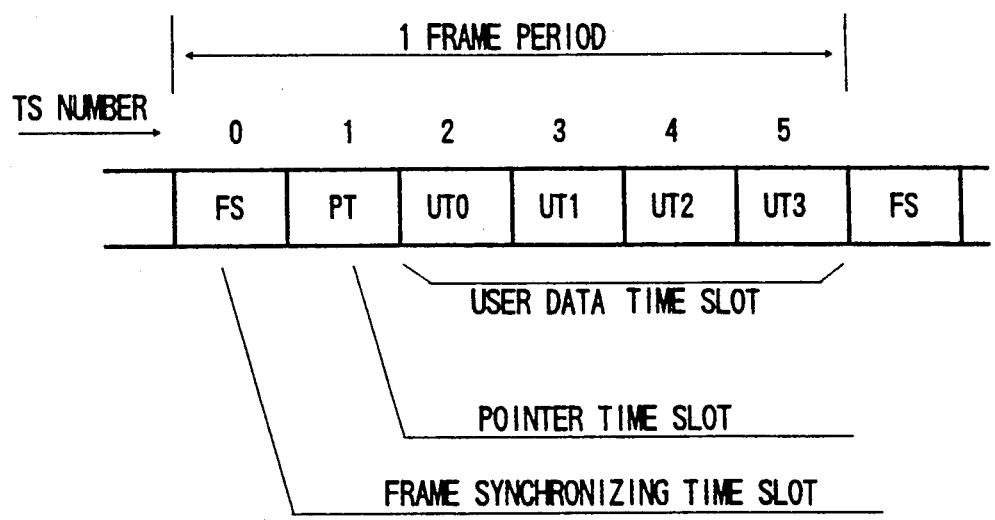
Fig. 2 shows a data format showing a time slot arrangement of one frame period.

FIG. 2 shows a highway format indicating time slot assignment in an input/output highway. In this embodiment, in a highway, one frame period is constituted by six time slots of time slot (TS) numbers 0 to 5. A time slot $TS_0$ is used to store a frame synchronizing signal (FS). A time slot $TS_1$ is used to store a pointer (PT). Time slots $TS_2$ to $TS_5$ are respectively used to store user data ($UT_0$ to $UT_3$) Four channels, i.e., a channel 0 ($CH_0$) to a channel 3 ($CH_3$) are stored in user data channels. The pointer (PT) indicates a specific time slot number at which the channel $CH_0$ is stored.

Figure 3:
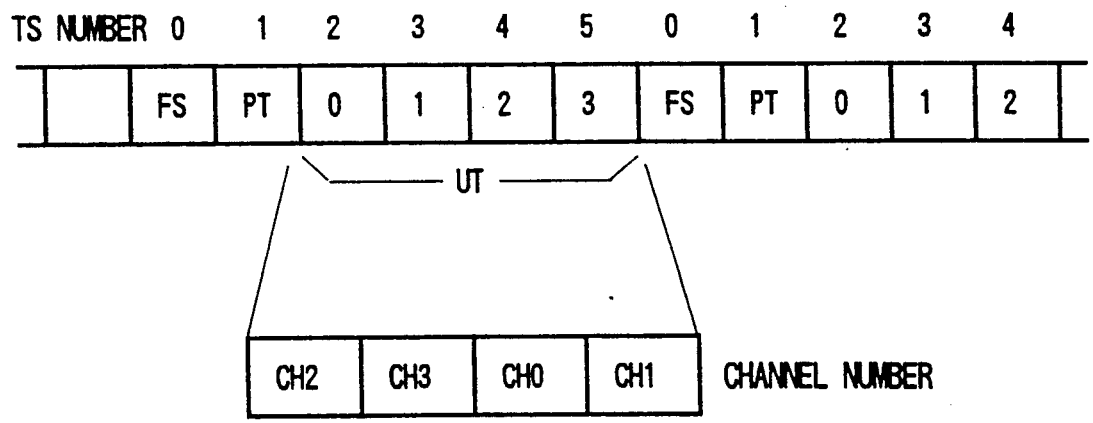
FIG. 3 shows a data format showing a time slot arrangement of a highway.

FIG. 3 shows a format exemplifying an input/output highway. In this format, the pointer (PT) value is 4 and hence indicates that the channel $CH_0$ is stored in the time slot $TS_4$ (i.e., $UT_2$), and the channels $CH_1$, $CH_2$, and $CH_3$ are repeatedly stored in $UT_3$, $UT_0$, and $UT_1$.

Figure 4:
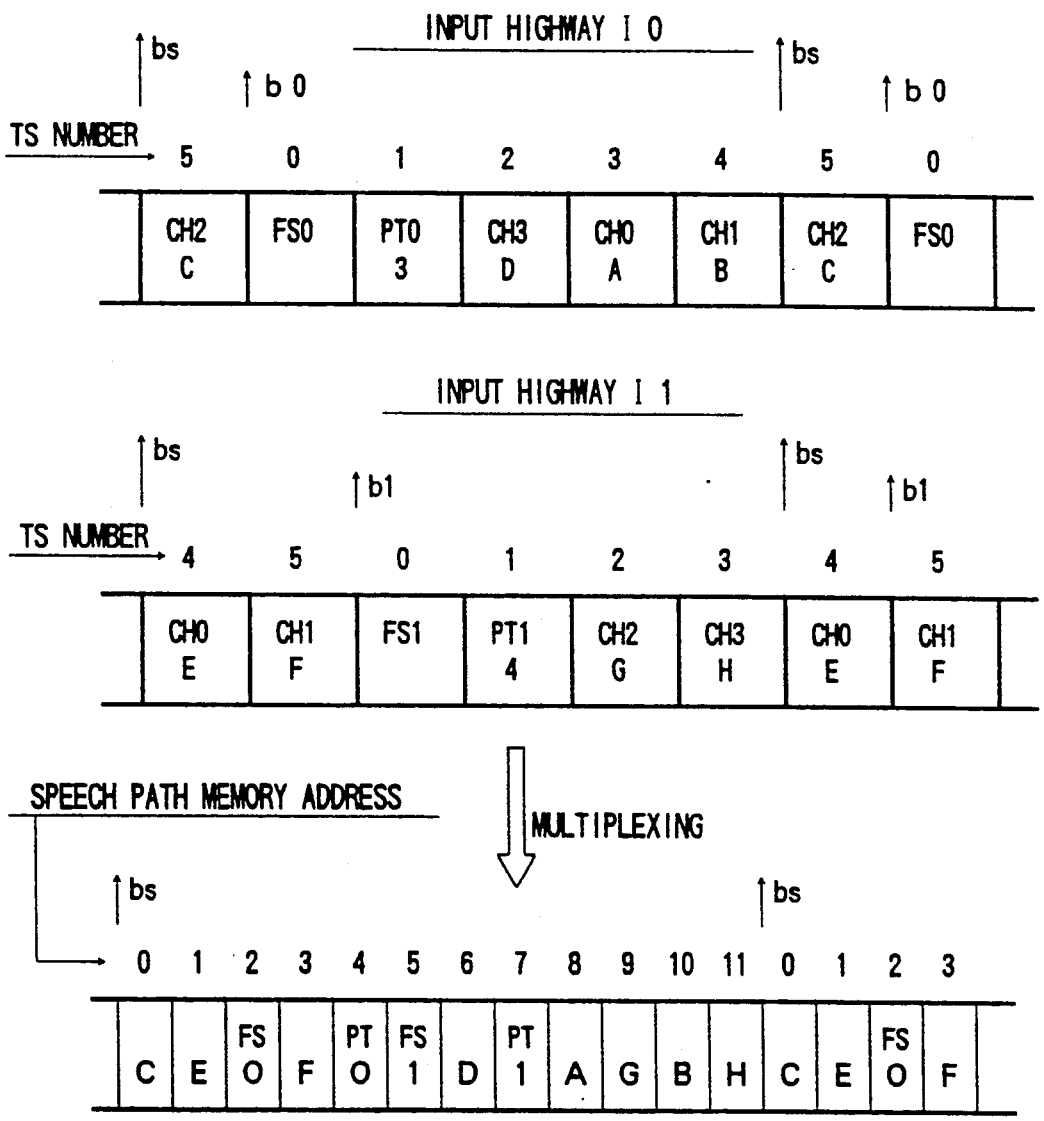
FIG. 4 shows data formats representing a relationship data obtained by multiplexing data from input highways and corresponding addresses with reference to FIGS. 2 and 3.

FIG. 4 shows frame formats of outputs from the frame synchronization detectors 10 and 11 to the multiplexer 30 in the input highways $I_0$ and $I_1$, exemplifying a relationship between the input highways and multiplex operations. Byte phases of data which are input from the input highways to the frame synchronization detectors 10 and 11 at different phases are synchronized so as to match the byte divisions with each other. Phases b0 and b1 of the input highways are detected by the frame synchronization detectors 10 and 11, and a system phase bs is set by the multiplexer 30. Referring to FIG. 4, the input highways $I_0$ and $I_1$ respectively have pointer values of 3 and 4. The channels $CH_0$ to $CH_3$ of the input highway $I_0$ are used to send data A to D, and the channels $CH_0$ to $CH_3$ of the input highway $I_1$ are used to send data E to H. The pointer detectors 20 and 21 respectively detect a phase difference of one byte and a pointer value of 3 from the input highway $I_0$, and a phase difference of two bytes and a pointer value of 4 from the input highway $I_1$, and output them to the multiplexer 30. The multiplexer 30 sequentially and repeatedly forms inner formats to be output to the speech path memory 40 as data C.E, $FS_0$, data F, $PT_0$, $FS_1$, data D, $PT_1$, data A.G.B.H with respect to write addresses 1 to 11 of the speech path memory. In this case, numerals 0 and 1 respectively indicate the input highways $I_0$ and $I_1$, and the above-mentioned table contents represent speech path memory addresses (SPM addresses) and storage data of the speech path memory 40. The speech path memory 40 executes write operations in accordance with SPM addresses output from the counter 52.

FIG. 5 is a table showing specific SPM addresses to which the contents of the respective time slots of the input highways as shown in FIGS. 2 to 4 correspond, and specific data to be written as SPM data. In this embodiment, since the input highway $I_0$ has a frame phase difference of one byte, it can be calculated that a frame synchronizing signal ($FS_0$) is written at an SPM address 2, and the SPM addresses of a pointer and each channel are uniquely determined, as shown in FIG. 5. The same applies to the input highway $I_1$.

FIG. 6 is a table showing a relationship between SCM addresses and SCM data of the speech path control memory 53 as shown in FIGS. 2 to 5, which corresponds to path connecting data of the speech path. Referring to FIG. 6, a relationship between SCM addresses and the output highways $O_0$ and $O_1$ is determined by output highway numbers and time slot numbers obtained after data read from the speech path memory 40 is demultiplexed. More specifically, when a pointer value of 2 is set in an output highway (a format in which $CH_0$ is set in $TS_2$), SCM address=(TS number on output highway×2)+output highway number For example, SCM address=5 corresponds to $CH_0$ of the output highway $O_1$. A relationship between SCM data and an input highway is determined by a specific channel of the input highway to be connected to the corresponding channel of the output highway, i.e., SCM data=(TS number on input highway obtained when pointer value is 2×2)+input high number (in this case, calculations are always performed on the assumption that the pointer value is 2). For example, in this embodiment, path setting is performed to connect the input highway $I_1$ $CH_3$ (SCM data 11) to the output highway $O_1$ $CH_0$ (SCM address 5).

Figure 7:
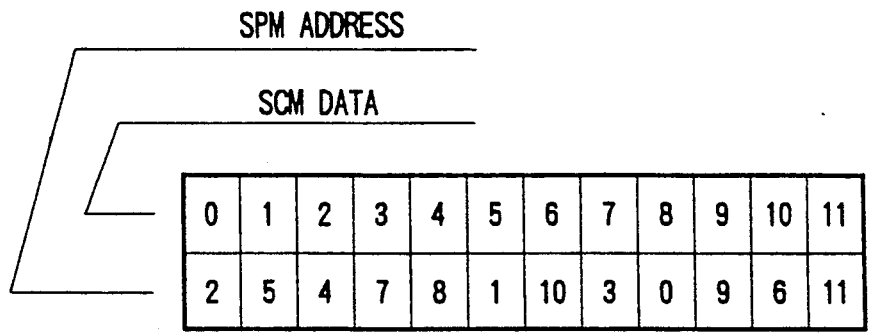
FIG. 7 is a contrast table showing a conversion rule of an address converter with reference to FIGS. 5 and 6.

FIG. 7 is a contrast table showing a relationship between SCM data and SPM addresses based on the tables shown in FIGS. 5 and 6. Since the relationship between the input highways and the SPM addresses can be uniquely determined when the pointer values of the input highways can be obtained as shown in FIG. 5, the relationship between the SPM addresses and the SCM data can be established as shown in FIG. 7 on the basis of the relationship between the input highways and the SCM data shown in FIG. 6. For example, the input highway $I_1$ (number 1).$CH_3$ corresponds to SCM data 11 as shown in FIG. 6, and SCM data 11 shown in FIG. 7 corresponds to SPM address 11. In this case, SCM data can be simply calculated according to the above-mentioned equation on the basis of input highway and TS numbers (a corresponding channel number can be uniquely determined by conversion from the format having a pointer value of 2), and is determined regardless of the phase and pointer value of the input highway. In contrast to this, an SPM address is determined by the actual phase and pointer value of the input highway. Even if the phase and pointer value of an input highway differ from those in this embodiment, the relationship between an SPM address and a channel can be uniquely determined and can be easily obtained.

Figure 8:
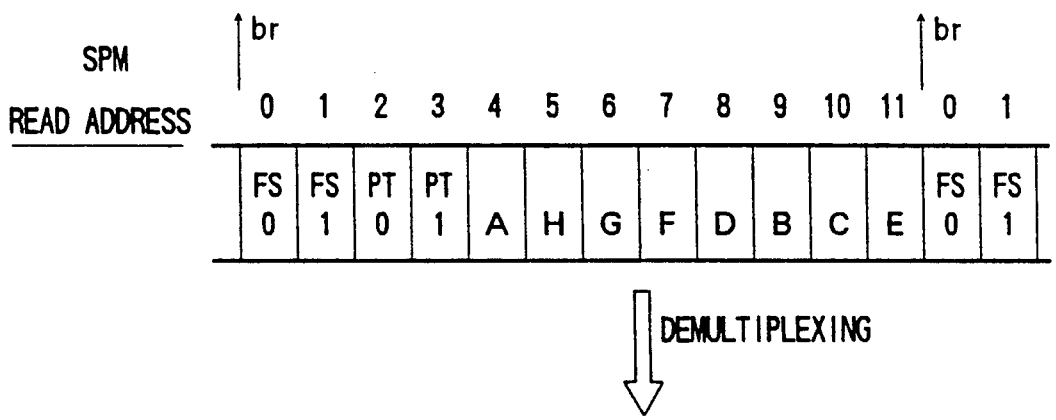
FIG. 8 shows data formats of the speech path memory and an output highway with reference to FIGS. 2 to 7.
Figure 8:
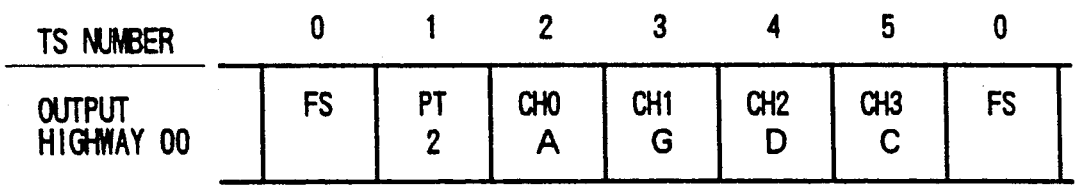
Figure 8:
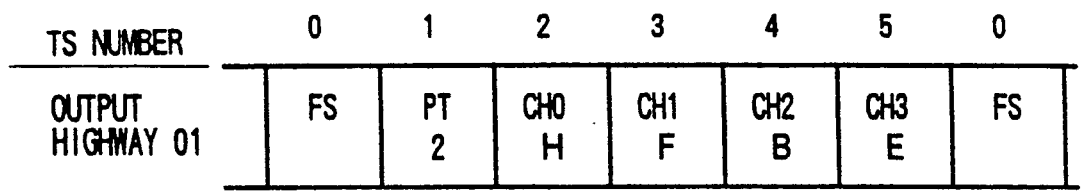

FIG. 8 is a frame format showing data read out from the speech path memory 40 on the basis of the data shown in FIGS. 2 to 7, and data on the output highways $O_0$ and $O_1$ obtained by demultiplexing the read data by using the demultiplexer 31. SCM data read out from the speech control memory 53 are converted into addresses by the address converter 51 in accordance with the conversion rule shown in FIG. 7, and are supplied to the speech path memory 40 as SPM addresses at which data are actually read out from the speech path memory 40. Data which are read out from the speech path memory 40 in accordance with these SPM addresses respectively correspond data $FS_0$, $FS_1$, $PT_0$, $PT_1$, A, H, G, F, D, B, C, and E at read addresses 0 to 11. Since data is read out from the speech path control memory 53 at a phase br independent of the system phase bs, the phases bs and br may be different from each other. Referring to FIG. 8, the data $FS_0$, $FS_1$, $PT_0$, $PT_1$, A, H, G, F, D, B, C, and E are sequentially stored as the read addresses 0 to 11, respectively. Upon demultiplexing, a pointer value of 2 is output to the output highway $O_0$ together with the data A, G, D, and C for $CH_0$ to $CH_3$. In addition, a pointer value of 2 is output to the output highway $O_1$ together with the data H, F, B, and E for $CH_0$ to $CH_3$. These pointer values are determined by the pointer inserting circuits 60 and 61. Referring to FIG. 8, the information in the respective channels reveals that conversion of time slots is performed in accordance with the path connecting data from the speech path control memory 53. For example, the input highway $I_1$.$CH_3$ is interchanged with the output highway $O_1$.$CH_0$ (data H).

It is easily estimated that even an arrangement similar to the arrangement in this embodiment can be used even if the number of highways and the number of slots are different from those in the embodiment.

As has been described above, according to the time division speech path apparatus of the present invention, pointers are set on highways so that a relationship between the time slots on the highways and addresses of the speech path memory at which the time slots are written is determined on the basis of the frame phases and pointer values of the respective highways. Data read out from the speech path control memory are converted into addresses in accordance with this relationship and are supplied as read addresses to the speech path memory. With this arrangement, time division switching of a plurality of input highways having different phases can be performed without using a buffer memory for matching the frame phases of the input highways. This prevents an increase in delay time and hardware amount due to buffer memories.

What is claimed is:

1. A time division speech path apparatus, having time division highways having different frame phases as input highways, for performing time division switching between time slots of the input highways and output highways by using a multiplexer for the time division highways, a speech path memory, and a speech path control memory, said time division speech path apparatus comprising:

a frame synchronization detector for detecting frame positions (highway phases) on data formats of the respective input highways and synchronizing byte phase divisions between the input highways, each of the data formats being constituted by a pointer consisting of at least one byte representing a time slot position at which a first channel of user data on a corresponding one of the time division highways is stored, and a plurality of time slots for carrying a plurality of user data;

a pointer detector for holding a difference between a highway phase from said frame synchronization detector and a specific system frame phase of said speech path apparatus and a pointer value read out from contents of the pointer of each of said input highways;

a pointer inserting circuit for writing pointer values in pointers on said output and input highways;

an address converter for converting data read out from said speech path control memory and outputting the converted data as an address of said speech path memory;

a selector for selecting and supplying sequential addresses, which are sequentially generated by a counter in accordance with the system frame phase, to said speech path memory during a write mode of said speech path memory so as to sequentially write data obtained by multiplexing data from said input highways in said speech path memory, and selecting and supplying an address to said speech path memory during a read mode of said speech path memory, the address being obtained by converting contents read out from said speech path control memory according to a predetermined rule on the basis of contents of a pointer value held in said pointer detector so as to actually read data from said speech path memory; and a demultiplexer for sequentially reading out contents from said speech path memory, demultiplexing the read contents, and outputting the demultiplexed data to said output highways.

* * * * *